United States Patent
Hayes et al.

(10) Patent No.: US 8,086,684 B2
(45) Date of Patent: Dec. 27, 2011

(54) DETECTING AND MITIGATING UNDELIVERABLE EMAIL

(75) Inventors: Sean Hayes, Phoenix, AZ (US); Ben Butler, Mesa, AZ (US); Jason Steiner, Glendale, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 147 days.

(21) Appl. No.: 12/763,726

(22) Filed: Apr. 20, 2010

(65) Prior Publication Data

US 2011/0258217 A1    Oct. 20, 2011

(51) Int. Cl.
*G06F 15/16* (2006.01)
(52) U.S. Cl. ......... 709/206; 709/203; 709/224; 709/229
(58) Field of Classification Search .................. 709/203, 709/206, 224, 229
See application file for complete search history.

(56) References Cited

U.S. PATENT DOCUMENTS

| | | | |
|---|---|---|---|
| 5,905,862 A | 5/1999 | Hoekstra et al. |
| 5,995,597 A | 11/1999 | Woltz et al. |
| 5,999,932 A | 12/1999 | Paul |
| 6,023,723 A | 2/2000 | McCormick et al. |
| 6,052,709 A | 4/2000 | Paul |
| 6,092,101 A | 7/2000 | Birrell et al. |
| 6,161,130 A | 12/2000 | Horvitz et al. |
| 6,167,434 A | 12/2000 | Pang |
| 6,249,805 B1 | 6/2001 | Fleming, III |
| 6,266,692 B1 | 7/2001 | Greenstein |
| 6,298,341 B1 | 10/2001 | Mann et al. |
| 6,321,267 B1 | 11/2001 | Donaldson |
| 6,393,465 B2 | 5/2002 | Leeds |
| 6,519,589 B2 | 2/2003 | Mann et al. |
| 6,560,634 B1 | 5/2003 | Broadhurst |
| 6,615,242 B1 | 9/2003 | Riemers |
| 6,654,787 B1 | 11/2003 | Aronson et al. |
| 6,691,156 B1 | 2/2004 | Drummond et al. |
| 6,732,157 B1 | 5/2004 | Gordon et al. |
| 6,745,248 B1 | 6/2004 | Gardos et al. |
| 6,789,103 B1 | 9/2004 | Kim et al. |
| 6,868,436 B1 | 3/2005 | Fleming, III |

(Continued)

OTHER PUBLICATIONS

Burton Computer Corporation, SpamProbe v0.7 README, Sep. 11, 2001.

(Continued)

*Primary Examiner* — Khanh Dinh
(74) *Attorney, Agent, or Firm* — Chris A. Watt

(57) ABSTRACT

Systems and methods of the present invention provide for detecting and mitigating abuse of undeliverable email or "bounced" emails. An administrator may import a list of email addresses for one or more contacts. The opt-in software may determine if each email address in the list of email addresses is opted in to receive an email distribution, and if so, a bounce detection software may determine if each email address is found in a database of known undeliverable or "bounced" email addresses. If so, an abuse-mitigation software may defer importing the list of email addresses and display an alert referring the administrator to an abuse department for review of the account. A message-delivery software may deliver the email distribution, and the bounce detection software may then determine whether undeliverable emails in the email distribution exceed one or more "bounce limit rules," and if so, the abuse mitigation software may delay delivery of the email distribution and display an alert referring the administrator to the abuse department for review of the account. Otherwise, delivery may continue to completion.

36 Claims, 2 Drawing Sheets

U.S. PATENT DOCUMENTS

| | | | |
|---|---|---|---|
| 6,880,007 | B1 | 4/2005 | Gardos et al. |
| 6,895,430 | B1 | 5/2005 | Schneider |
| 6,901,398 | B1 | 5/2005 | Horvitz et al. |
| 7,072,944 | B2 | 7/2006 | Ladonde et al. |
| 7,320,020 | B2 | 1/2008 | Chadwick et al. |
| 7,457,823 | B2 * | 11/2008 | Shraim et al. ............ 1/1 |
| 7,992,204 | B2 * | 8/2011 | Shraim et al. ............ 726/22 |
| 8,041,769 | B2 * | 10/2011 | Shraim et al. ............ 709/206 |
| 2002/0035611 | A1 | 3/2002 | Dooley |
| 2002/0065903 | A1 | 5/2002 | Fellman |
| 2002/0091827 | A1 | 7/2002 | King et al. |
| 2002/0129013 | A1 | 9/2002 | Thomas |
| 2003/0191969 | A1 | 10/2003 | Katsikas |
| 2004/0044791 | A1 | 3/2004 | Pouzzner |
| 2004/0068460 | A1 | 4/2004 | Feeley et al. |
| 2004/0167982 | A1 | 8/2004 | Cohen et al. |
| 2004/0210640 | A1 | 10/2004 | Chadwick et al. |
| 2004/0221016 | A1 | 11/2004 | Hatch et al. |
| 2005/0022008 | A1 | 1/2005 | Goodman et al. |
| 2005/0102354 | A1 | 5/2005 | Hollenbeck et al. |
| 2005/0188045 | A1 | 8/2005 | Katsikas |
| 2005/0210106 | A1 | 9/2005 | Cunningham |
| 2006/0068755 | A1 * | 3/2006 | Shraim et al. ............ 455/410 |
| 2006/0095528 | A1 | 5/2006 | Sykes |
| 2006/0129644 | A1 | 6/2006 | Owen et al. |
| 2007/0011252 | A1 | 1/2007 | Taylor |
| 2007/0294352 | A1 * | 12/2007 | Shraim et al. ............ 709/206 |
| 2007/0299777 | A1 * | 12/2007 | Shraim et al. ............ 705/51 |
| 2007/0299915 | A1 * | 12/2007 | Shraim et al. ............ 709/206 |

OTHER PUBLICATIONS

Mertz, David, Comparing a Half-Dozen Approaches to Eliminating Unwanted Email, Aug. 2002.
Relson, David, Multiple Wordlists, Mar. 15, 2003.
Unpublished U.S. Appl. No. 12/763,726, filed Oct. 20, 2011.
Unpublished U.S. Appl. No. 12/763,764, filed Oct. 20, 2011.

* cited by examiner

DETECTING AND MITIGATING UNDELIVERABLE EMAIL

CROSS REFERENCE TO RELATED PATENT APPLICATIONS

This patent application is related to the following concurrently-filed patent applications:
U.S. patent application Ser. No. 12/763,764, "DETECTING AND MITIGATING UNSOLICITED EMAIL ABUSE."

The subject matter of all patent applications is commonly owned and assigned to The Go Daddy Group, Inc. All prior applications are incorporated herein in their entirety by reference.

FIELD OF THE INVENTION

The present inventions generally relate to the field of undeliverable email and unsolicited email and specifically to the field of detecting and mitigating undeliverable and unsolicited email.

SUMMARY OF THE INVENTION

The present inventions provide methods and systems for detecting and mitigating abuse of undeliverable email or "bounced" emails. An administrator for an account associated with a business ID may import a list of email addresses for one or more contacts into one or more software components in a software combination executed on one or more servers. This software combination may include an import software (used to import the list of email addresses for the one or more contacts), an opt-in software, a message delivery software, a bounce detection software and an abuse mitigation software. The opt-in software may determine if each email address in the list of email addresses is opted in to receive an email distribution from the administrator, and if so, the bounce detection software may determine if each email address is found in a database of known undeliverable or "bounced" email addresses.

If the email address is found in this bounced address database, the abuse-mitigation software may defer importing the list of email addresses and display an alert referring the administrator to an abuse department for review of the account. If not, the message-delivery software may deliver the email distribution over a specified interval to each email address opted in and process any emails bounced back. The bounce detection software may then determine whether undeliverable emails in the email distribution exceed one or more "bounce limit rules," and if so, the abuse mitigation software may delay delivery of the email distribution and display an alert referring the administrator to the abuse department for review of the account. Otherwise, delivery may continue to completion.

The present inventions also provide methods and systems for detecting and mitigating abuse of unsolicited email or "spam." An administrator for an account associated with a business ID may use an interface on a client to select one or more contacts from a list of contacts to opt in to receive an email distribution. The opt-in of the contacts may be accomplished by an opt-in software in a software combination executed on a server. The software components in the software combination may also include a message delivery software, an abuse detection software and an abuse mitigation software. The administrator may use the message deliver software to create and schedule the email distribution, possibly using a user interface on a client, and the message delivery software may then deliver the email distribution to each contact in the contact list using an email address associated with that contact.

The abuse detection software may then determine for each contact in the contact list whether the contact has read the email distribution and reported the email distribution as an unsolicited email message. If the abuse detection software determines that the plurality of reported unsolicited email or "spam" for the email distribution exceeds "spam limit rules," an abuse department may place a hold on the email distribution (possibly using abuse mitigation software) and display an alert referring the administrator to the abuse department for review of the account. Otherwise, the email distribution may continue to completion.

The above features and advantages of the present invention will be better understood from the following detailed description taken in conjunction with the accompanying drawings.

DETAILED DESCRIPTION

Figure 1:
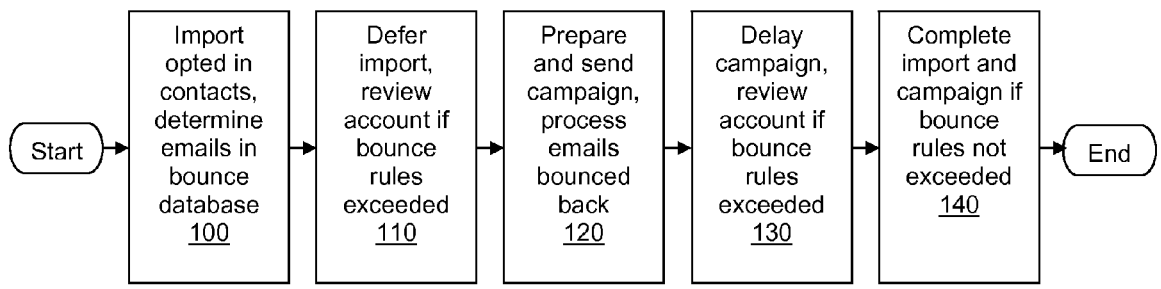
FIG. 1 is a block diagram illustrating a possible embodiment of a method for detecting and mitigating undeliverable email.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Users of computer networks, such as corporate networks or the Internet, routinely send electronic messages to each other. Electronic messages may contain, for example, text, images, links, and attachments. Electronic mail or email is one of the most widely used methods of communication over the Internet due to the variety of data that may be transmitted, the large number of available recipients, speed, low cost and convenience.

Email messages may be sent, for example, between friends, family members or between coworkers thereby substituting for traditional letters and office correspondences in many cases. This is made possible because the Internet has very few restrictions on who may send emails, the number of emails that may be transmitted and who may receive the emails. The only real hurdle for sending emails is the requirement that the sender must know the email address (also called network mailbox) of the intended recipient.

Email messages travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most Internet users find emails to be much more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and a network connection have been obtained, there are typically few additional costs associated with sending emails. This remains true even if millions, or more, of emails are sent by the same user. Emails thus have the extraordinary power of allowing a single user to send one or more messages to a very large number of people at an extremely low cost.

The Internet has become a very valuable tool for business and personal communications, information sharing, commerce, etc. However, some individuals have abused the Internet. Among such abuses are spam and phishing. Spam, or unsolicited email, is flooding the Internet with many copies of the identical or nearly identical message, in an attempt to force the message on people who would not otherwise choose to receive it. Most spam is commercial advertising, often for dubious products, get-rich-quick schemes, or financial or quasi-legal services.

A single spam message received by a user uses only a small amount of the user's email account's allotted disk space, requires relatively little time to delete and does little to obscure the messages desired by the user. Even a small number of spam messages, while still annoying, would nonetheless cause relatively few real problems. However, the amount of spam transmitted over the Internet is growing at an alarming rate. While a single or small number of spam messages are annoying, a large number of spam can fill a user's email account's allotted disk space thereby preventing the receipt of desired emails. Also, a large number of spam can take a significant amount of time to delete and can even obscure the presence of desired emails in the user's email account.

Spam messages currently comprise such a large portion of Internet communications that they actually cause data transmission problems for the Internet as a whole. Spam creates data log jams thereby slowing the delivery of more desired data through the Internet. The larger volume of data created by spam also requires the Internet providers to buy larger and more powerful, i.e. more expensive, equipment to handle the additional data flow caused by the spam.

Spam has a very poor response rate compared to other forms of advertisement. However, since almost all of the costs/problems for transmitting and receiving spam are absorbed by the recipient of the spam and the providers of the Internet infrastructure, spam nevertheless continues to be commercially viable for a spammer.

In contrast to spam, a user may desire to receive updates from various marketing channels, which may keep the user apprised of various sales, new store openings, industry news, etc. within certain businesses. The operators and administrators of such businesses may likewise be interested in sending such information to potential clients, subscribers and/or customers.

The administrator of software for such an Internet business may send out legitimate email campaigns using the software combination disclosed herein, executed on a server in a data center and displayed on a client machine to interested contacts. These administrators may also keep track of contacts they may have made using combinations of the software components described herein.

Detecting and Mitigating Undeliverable Email

Several different methods may be used to provide and manage the disclosed invention. In an example embodiment illustrated in FIG. 1, one or more software components in a software combination executed on one or more servers, specifically the import software, may import a list of email addresses for one or more contacts, possibly from data storage or other software components (Step 100). The software combination, servers and data storage may be communicatively coupled to a network.

An opt-in software component may determine if each email address in the list is opted in to receive an email distribution, possibly a marketing campaign, from an administrator associated with a business ID. For each email address opted in, a bounce detection software may determine if the email address is found in a database of known undeliverable email addresses, or a "bounced address database" (Step 100).

If the amount of opted-in email addresses found in the bounced address database is greater than an amount allowed by one or more "bounce limit rules," described herein, an abuse mitigation software may defer importing the email addresses for the opted-in contacts (Step 110). The abuse mitigation software may also display an alert to the administrator referring the administrator to an abuse department for review of the account (Step 110). The alert may be displayed on a user interface on a client communicatively coupled to the network.

If the amount of imported opted-in email addresses in the bounced address database is not greater than the amount allowed by the bounce limit rules, the administrator may use a message delivery software to prepare and deliver an email distribution, possibly a marketing campaign, to the email addresses for the opted-in contacts over a specified interval (Step 120). The message-delivery software component may process the emails which "bounce back," or which are determined to be undeliverable (Step 120).

The bounce mitigation software may then determine whether the number of "bounce back" emails received during the email distribution is greater than an amount allowed by the bounce limit rules (Step 130). If the amount of these undeliverable emails is greater than the amount allowed by the bounce limit rules, the abuse mitigation software may delay delivery of the email distribution (Step 130). The abuse-mitigation software may also display an alert, possibly on a user interface on a client communicatively coupled to a network, to the administrator, referring the administrator to an abuse department for review of the account (Step 130).

If the amount of undeliverable emails is not greater than the amount allowed by the bounce limit rules, the steps for sending the email distribution and determining if the bounced emails exceed the bounce limit rules may be repeated until either the email distribution completes, or the bounced emails exceed the bounce limit rules (Step 140).

Figure 2:
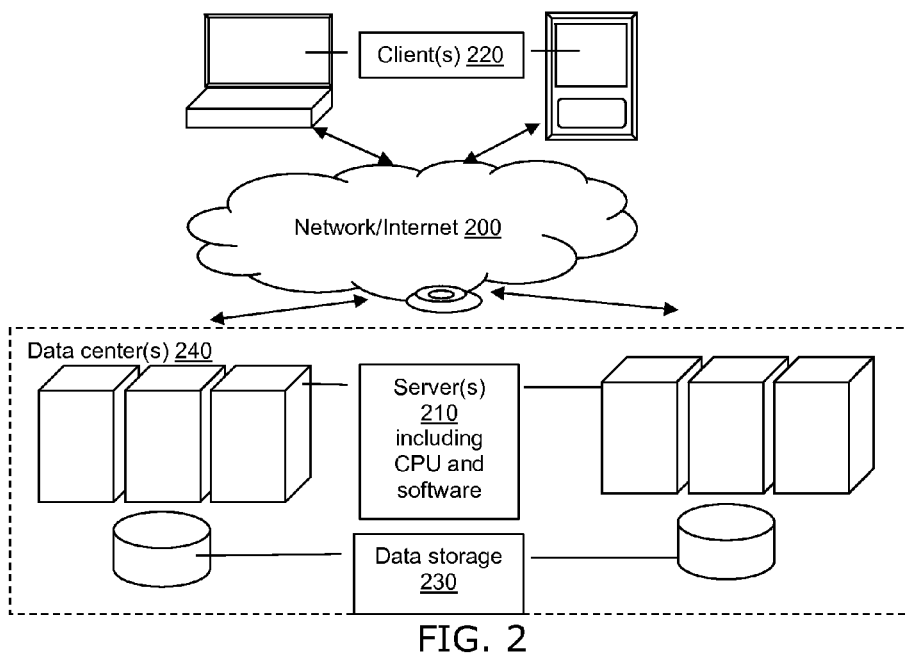
FIG. 2 illustrates a possible system for detecting and mitigating undeliverable email abuse and detecting and mitigating unsolicited email abuse.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules/components) in computer-readable media accessible to the CPU, such as a hard disk drive on a server 210 and/or client 220.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users such as the administrator, contacts, subscribers, etc. Thus, as non-limiting examples, users may comprise any individual, entity, business, corporation, partnership, organization, governmental entity, and/or educational institution that may have occasion organize/import contacts and/or send email distributions such as a marketing campaign.

Server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Noncommand user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 may be communicatively coupled to data storage 230 of contact information, email distribution information, abuse information, import information, opt-in information, bounced email information, or any other information requested or required by the system. The data storage 230 may be any computer components, devices, and/or recording media that may retain digital data used for computing for some interval of time. The storage may be capable of retaining stored content for any data required, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

A data center 240 may provide hosting services for the software combination, or any related hosted website including, but not limited to hosting one or more computers or servers in a data center 240 as well as providing the general infrastructure necessary to offer hosting services to Internet users including hardware, software, Internet web sites, hosting servers, and electronic communication means necessary to connect multiple computers and/or servers to the Internet or any other network 200. These data centers 240 or the related clients 220 may accept messages from text messages, SMS, web, mobile web, instant message, third party API projects or other third party applications.

The software modules/components of the software combination used in the context of the current invention may be stored in the memory of—and run on—at least one server 210. As non-limiting examples of such software, the paragraphs below describe in detail the software modules/components that make up the software combination. These software modules/components may comprise software and/or scripts containing instructions that, when executed by a microprocessor on a server 210 or client 220, cause the microprocessor to accomplish the purpose of the module/component as described in detail herein. The software combination may also share information, including data from data sources and/or variables used in various algorithms executed on the servers 210 and/or clients 220 within the system, between each module/component of the software combination as needed.

The software combination may include a business profile software, configured to, as non-limiting examples, receive, store, track and/or generate, as necessary, information and identifying features about a business, such as a business identification (labeled "business ID" herein). The administrator may be associated with this business ID via an administrator account within any of the software in the software combination. The system may use this business ID, for example, to compare to instances of abuse stored in a database of known system abuse, described herein.

The software combination may include an import software configured to, as non-limiting examples, import a list of contacts and/or a list of email addresses for the contacts in the contact list. This contact list may be retrieved from data storage 230 or other software components in the software combination, possibly to manage the contacts within and between these components. The import software may also import contact email addresses, which are "opted in" for purposes of comparing the opted in email addresses with a database of known undeliverable email addresses or "bounced address database."

As a non limiting example of a contact import for opted in contacts, the import software may import opted in contacts from a contact management software into a message delivery software (both described below), allowing the message delivery software component to manage the contacts when sending an email distribution, such as a marketing campaign. To accomplish this, the import software may display an interface to allow the administrator to review, compare and map contacts and contact information between software in the software combination. For example, in comparing information between the contact management software and the message delivery software so that the message delivery software may manage the contact information for email campaign purposes, the administrator may choose to accept, skip or update the contact information for each contact imported, including opt-in status, described below.

At the conclusion of importing contacts, import results may be displayed to the administrator on a user interface on a client, including how many records were imported, how many contacts were imported and opted in, how many records were updated during the import, how many records failed to import, how many system warnings or errors were involved in the import, or any other information the administrator may need to know regarding the import.

The software combination may include an opt-in software configured to, as non-limiting examples, allow the administrator to opt in a contact to an email distribution and determine, for each email address in a list of email addresses, if the email address is opted in to receive the email distribution. The opt-in software may also accept a selection of one or more contacts in a contact list opted in by an administrator to receive an email distribution or other correspondence from the administrator, allow a contact or potential contact to opt-in directly to an email distribution and/or opt out of such correspondence.

The system may track the opt-in status of contacts throughout the system in the opt-in procedures described herein and may store these statuses in data storage. As non-limiting examples, a contact may have a status of "unverified" if the contact was manually added without selecting an opt-in status or imported where the administrator did not want the opt-in logic applied. The contact may have a status of "pending" if the contact has been sent a permission email described below and/or if the permission email does not bounce as an undeliverable email. The contact may have a status of "opted-in" if the contact has opted in directly and confirmed by way of permission email or by way of the administrator's website, if the administrator has manually opted-in a contact or if the administrator has imported a list with the setting the administrator may 'already have permission.'

The contact or potential contact may opt in directly, either via a sign up form on a webpage created and managed by the administrator and hosted by the opt-in system or via a permission email, thereby setting the opt in status for the contact to "opted in. If the contact has a status of "opted in," the processes for bounce, spam and abuse mitigation described herein may not be necessary, since the email would not be found in a database of known undeliverable email or abuse, would not bounce as an undeliverable email and would not be reported as unsolicited email.

The contact may have a status of "opted-out" if the contact has either gone to the administrator's opt-in webpage to unsubscribe or received an email distribution and unsubscribed (and/or reported the message content as an unsolicited "spam" email). The contact's status may also be "opted-out" if the contact's email address is found in the database of known undeliverable emails during import or if an email distribution sent to the contact's email address bounces as an undeliverable email. If contacts have a status of "opted out," those contacts may not be included in future email distributions.

The opt-in software may be accessible and/or integrated as a user interface in the import, contact management and/or message delivery software described herein. For example, the administrator may choose to opt in a contact during an import, while reviewing contact information and/or while selecting contacts to manage when sending out an email distribution. The system may present details for the contact, including opt-in information, which the administrator may edit. The system may disable the option to edit if the business ID for that administrator is found in a database of known abuse, the email address for the contact is found in a database of known undeliverable email, or if the business ID is flagged for unsolicited email abuse.

If the administrator selects to opt in a contact, the system may display the following options, possibly via checkboxes or radio buttons on a provided user interface: 'confirm contact permission via email' or 'I already have permission, I just want to email them.' As the second option implies, the administrator may opt in a contact, on behalf of the contact. In order to accomplish this type of "admin opt in," the system may require an "opted in" status for the contact, or the administrator may have chosen not to apply the opt in logic as described above.

If the administrator chooses to 'confirm contact permission via email,' the opt-in and/or message delivery software may be used to send permission emails for contacts to opt in to email distributions or other correspondence from the administrator. The opt-in software may display an interface for the administrator to view and edit the subject, body and/or footer of the permission email. In other embodiments, if the contact chooses to opt out, the permission email may include radio buttons and/or checkboxes allowing the contact to select a reason for unsubscribing, including loyalty to another business, criticism of the distribution layout, contact received the email from an unknown sender, contact received too much email from this sender, etc.

This permission email may then be sent to the contact or potential contact to confirm that they want to receive email distributions or other correspondence from the administrator. Any methods or system described herein for email distributions may also apply to permission emails. For example, permission emails may be compared with a database of known undeliverable emails, be subject to bounce limit rules or spam limit rules, be subject to email distribution/stagger rules when sent for a first time and/or any other mitigation methods described herein. The contact may sign up via the permission email or administrator webpage and a confirmation email may be sent to the contact when the opt-in or opt-out has been confirmed.

If the administrator selects a checkbox or radio button on the displayed user interface labeled 'opt in these contacts during import,' the system may activate a series of radio buttons to verify whether the administrator has corresponded with the contact in the last 6 months. If contact correspondence has occurred within the last 6 months, the administrator may already have permission to import the contact and/or send email distribution. However, if desired, the admin may also send a permission email.

Contact greater than 6 months may require permission email, which may cause the system to auto-set the checkbox/radio button to 'confirm contact permission via email.' Permission emails may be generated for those contacts, and the system may display a warning about bounce rates and spam complaints. If the administrator has never communicated with these contacts, the system may present a notification that all imported contacts must know who the administrator is and what the administrator is sending them. If none of the contacts are familiar to the administrator, the list should be discarded by the administrator and the contacts should use the sign up form to collect new contacts.

The software combination may include a message delivery software configured to, as non-limiting examples: prepare an email distribution such as a marketing campaign by receiving a message content and schedule from the administrator, deliver the email distribution to each contact in a list of contacts via an email address associated with each contact, possibly over a specified interval, and process "bounced back" emails during the email distribution as undeliverable email in the email distribution.

The message delivery software may also be configured to set up an account for the administrator, manage the email distribution (including managing images and "credits," which the administrator may pay for each email sent), generate reports, update settings for the email distribution or any combination thereof. The message delivery software may send permission emails, allowing a contact to opt in to an email distribution, possibly as a member of a group, to receive such email distributions. The message delivery software may allow the user to personalize the message content for the email distribution, including text, images, headers, footers, color schemes, customers or groups the email distribution may be sent to.

The system may assign emails distributions statuses such as "draft" "scheduled" "in progress" "paused" and "sent." The administrator can view, edit, view reports for, copy and/or delete a campaign via a series of links and/or buttons in an interface for the message delivery software. In addition, for drafts and scheduled campaigns, campaigns in progress, paused email campaigns and sent campaigns, the interface may include links and/or buttons to send the campaign, pause the campaign, resume the campaign or resend the campaign respectively.

After sending campaigns, the system may display reports for sent campaigns including opened, unsubscribed and bounced emails, bounce rates, click through statistics, etc. Details for each element of the report may be viewed by clicking on a link or button which displays details about that element in a pop in window. The campaign may be resent to undeliverable emails and new opt-ins, or the campaign may be copied and sent to new contacts.

The message delivery software, as well as other software components in the software combination, may be subject to "email distribution rules." The software in the software combination may send email distributions in batches, and the system may stagger email distributions for first-time email distributions, permission emails, or any other email distributions. As a non-limiting example, the email distribution rules may apply a stagger rule as follows: First, 50 emails may be sent in one batch, then there may be a 5 minute delay, then the next 50 emails may be sent in a second batch, then there may be a 5 minute delay, and so on. This example should limit neither the batch size nor the delay time of the email distribution and/or stagger rules. Thus, the email distribution rules may determine a batch size and a delay time between sending one or more batches of email in an email distribution.

In one non-limiting example embodiment, the message delivery software may determine that the email distribution is being sent to recipients/contacts for the first time. In this embodiment, rather than send out the entire email distribution at once and risk a high volume of undeliverable emails or emails reported as unsolicited emails, the message-delivery software component may send the email distribution over a specified interval in batches of 50, waiting 5 minutes before sending each batch. The message delivery software may also monitor and/or process undeliverable emails bounced back. A similar logic may be applied to sending permission emails when opting in new contacts: the permission emails may be sent according to a specified batch size, applying a delay time between sending batches, possibly to monitor and/or process undeliverable emails that bounce back. Email addresses which are not in the bounced address database, are not undeliverable or unsolicited and/or in an abuse database may be sent all at once.

The software combination may include an a bounce detection software configured to, as non-limiting examples: determine for each email in a list of email addresses, if the email address is found in a database of known undeliverable email addresses, determine if the email addresses found in the database of known undeliverable email addresses exceeds that allowed by one or more bounce limit rules and determine whether a plurality of undeliverable emails in the email distribution exceeds one or more bounce limit rules.

The bounce-detection software component may reference a bounce table, such as that shown below, possibly stored as data fields or variables in the system, as a validation point before certain actions may be taken. This bounce table may determine a threshold number of bounced emails, or percentage of bounced emails compared to total emails. When the threshold is exceeded, the system may suspend or disable a process in progress. Examples may include, but are not limited to importing opted-in contacts, delivering email distributions such as marketing campaigns or permission emails or sending another batch of email according to the email distribution rules, described herein.

| Low | High | Max % Bounce |
|---|---|---|
| 1 | 100 | 100.00 |
| 101 | 500 | 50.00 |
| 501 | 1000 | 30.00 |
| 1001 | 3000 | 8.00 |
| 3001 | 5000 | 5.00 |
| 5001 | 10000 | 5.00 |
| 10001 | 30000 | 3.00 |
| 30001 | 50000 | 2.00 |
| 50001 | 75000 | 1.00 |
| 75001 | 100000 | 1.00 |
| 100001 | 2000000000 | 1.00 |

As a non-limiting example, an email distribution which has sent between 1 and 100 emails must bounce 100% of the emails in order for the bounce detection software to delay the contact import, delivery of the email distribution, sending the permission emails, etc. and flag the administrators account/business ID for abuse. Since the email distributions rules require new email to be sent in batches of 50 emails (according to the non-limiting example in the "email distribution rules"), it is unlikely to see any issues at this level. As demonstrated in the table, the percentage of allowed bounces may decrease based on the number of emails sent for a given email distribution.

In the disclosed non-limiting embodiments, the bounce detection software may reference the bounce table to determine an excessive bounce rate in the email distribution by comparing a percentage of the one or more undeliverable bounced emails with the total of all emails sent in the email distribution. Likewise, the bounce limit rules may reference the bounce table to determine an excessive bounce rate while importing contacts by comparing a percentage of the one or more email addresses for the opted in contacts in the bounced email database with the total number of contacts imported. In other embodiments, the excessive bounce rate may be set as a straight number of bounced emails or emails found in the bounced emails database, etc.

As described below regarding abuse mitigation software, the system may ignore the established bounce limit rules if the abuse mitigation software has been configured to ignore such rules. In this case, the bounce detection software may ignore an excess of undeliverable email.

The software combination may include an abuse detection software configured to, as non-limiting examples: determine, for each contact in the list of contacts, whether the contact has read a message content and reported the email distribution as an unsolicited email message and determine if the plurality of reported unsolicited email for the email distribution exceeds the one or more spam limit rules.

As a non-limiting example, and as described above, a contact may receive a campaign or permission email with a link or button in the footer content, which allows the contact to report the email distribution as unsolicited email or "spam." The abuse detection software in this example may receive the read and reported spam message, and monitor the amount of spam emails received during a particular email distribution.

As described below regarding abuse mitigation software, the system may recognize a default amount of spam allowed for any given email distribution and/or business ID. The abuse detection software may determine if a plurality of reported unsolicited email exceeds these spam limit rules established by the system. This default amount of allowed spam may be overridden by an abuse mitigation software administrator to allow greater amounts of spam for each email distribution according to the discretion of the abuse department that oversees abuse of the system.

The abuse detection software may be configured to determine if a business ID associated with a process in progress is found in a database of known abuse violations. If a business ID is flagged for such abuse, or has otherwise been tagged with a status indicating an abuse attribute, the abuse detection software, or other software in the software combination, may disable a process in progress and refer the administrator for the account associated with that business ID to the abuse department.

The software combination may include an abuse mitigation software configured to, as non-limiting examples: display an alert referring the administrator to an abuse department for review of the account if the email addresses found in a database of known undeliverable email addresses exceeds one or more bounce limit rules or if a plurality of undeliverable emails exceeds the one or more bounce limit rules; defer importing a list of email addresses for one or more contacts if an email addresses found in a database of known undeliverable email addresses exceeds one or more bounce limit rules;

delay delivery of an email distribution if a plurality of undeliverable emails exceeds one or more bounce limit rules; or if a plurality of reported unsolicited email for an email distribution exceeds one or more spam limit rules, place a hold on the email distribution by an abuse department. "Abuse" as used herein may refer to an abuse of the system as well as an abuse department whose job it is to monitor abuses of the system.

This abuse department may use additional software components that augment functionality for the abuse detection and abuse mitigation software components. These software components may search for instances of abuse (possibly using the business ID or other identifying information for a business), display contact information, display email distribution details, display confirmation statistics, display import histories, update bounce or spam status, override bounce limit rules, update business opt-in status, update hold status on email distributions/imports or any combination thereof.

These software components may include an interface used to override the default amount of allowed spam for purposes of the spam limit rules for email distributions. For example, if the default spam allowed by the spam limit rules was 3, the interface may allow an override of this default to allow 25 total spam for the email distribution. The interface may also be used to ignore the bounce rules, require subscriber confirmation for the business ID associated with the email distribution and/or edit or delete holds for a business ID.

This interface may also be used to maintain the bounced address database, by searching for email addresses in the bounced address database and/or editing/deleting addresses in the bounced address database, possibly via "edit" or "delete" links next to the emails found.

The software combination may include a contact management software, configured to, as non-limiting examples, apply opt-ins to groups, export contacts and/or bulk import contacts. This contact management software may supply requested and selected contacts or groups of contacts to the message delivery software component for an email distribution and/or supply this information to any other software component in the software combination, as needed. As a non-limiting example, the contact management software may be configured for the administrator to select a list of email addresses for one or more contacts stored in data storage for the contact management software. The administrator may then use the message-delivery software component to manage these email addresses while sending out an email distribution.

In the non-limiting example embodiments herein, although certain configurations of the software combination are shown and described, any combination of software modules or software components in the software combination, or which may have functionality similar to that described herein, may be used to accomplish these embodiments. In other words, the system may use any configuration of hardware, software and/or software components disclosed to accomplish the same methods and systems. Each software module or software component is also not limited to the functionality disclosed herein. The software combination may further include any software configured to accomplish the systems and methods disclosed herein.

Detecting and Mitigating Unsolicited Email

Several different methods may be used to provide and manage the disclosed invention. In an example embodiment illustrated in FIG. 3, one or more software components or method steps in a software combination, as described in detail herein, executed on one or more servers, may accept a selection of one or more contacts from a contact list.

An opt in software may accept the selections of these admin opted in contacts from the administrator and the administrator may use the message delivery software component to create message content for, schedule and send/deliver an email distribution, possibly a marketing campaign, to each contact in the contact list (Step 300). The list of contacts may be stored in data storage and the software combination, servers and data storage may be communicatively coupled to a network.

The contact may open and read the message content and may have the option to respond to the message content, possibly via a footer within the email message to opt out of the email distribution and/or to report unsolicited email or "spam" (Step 310).

For each contact in the list of contacts, the abuse detection software may determine whether the contact has read the message content and reported the email distribution as an unsolicited spam email message (Step 320).

If the abuse detection software determines that a number of contacts in the contact list that report the message content as unsolicited email is greater than an amount allowed by the spam limit rules, the abuse mitigation software may then place a hold on the email distribution, via the abuse department that monitors abuse of the system (Step 330). The abuse mitigation software may also display an alert, possibly on a user interface on a client communicatively coupled to a network, to the administrator, referring the administrator to an abuse department for review of the account (Step 330).

If the number of contacts in the contact list that report the message content as unsolicited email is not greater than an amount allowed by the spam limit rules, the steps for sending the email distribution and determining if the spam for the contact list exceeds the spam limit rules may be repeated until either the email distribution completes, or the unsolicited emails exceed the spam limit rules (Step 340).

If an import or email distribution is unsuccessful for any of the reasons described herein, the system may display an alert message to the administrator that the contact import and/or email distribution was not successful with contact information for the abuse department. In addition, as seen in FIG. 4, the system may detect any number of problems described herein including, but not limited to: email addresses found in the database of known undeliverable addresses which exceed that allowed by the bounce limit rules; a plurality of undeliverable emails which exceed the bounce limit rules; reported unsolicited email for an email distribution which exceeds the spam limit rules; a business ID found in a database of known abuse violations or any combination thereof (Step 400).

Figure 4:
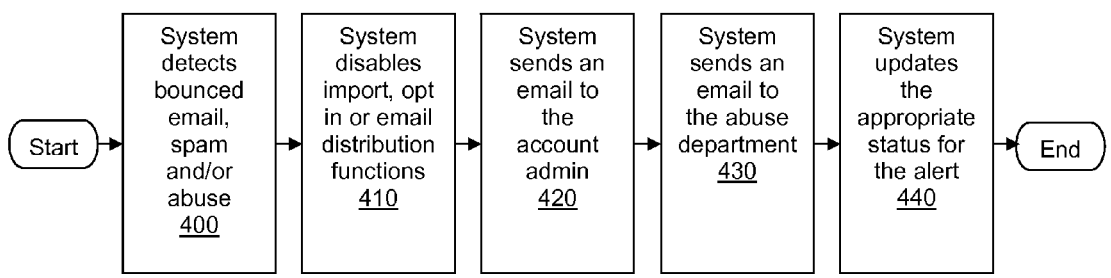
FIG. 4 is a flow diagram illustrating a possible embodiment of a method for system mitigation when problems are found in a given process in progress.

As seen in FIG. 4, the system may take several additional steps to mitigate these problems, including, but not limited to: disabling any further related import, opt-in and/or email distribution functionality (Step 410), sending an email to the administrator associated with the disabled process (Step 420), sending an email to the abuse department overseeing abuse of the process (Step 430), updating the data storage 230 to reflect the appropriate status for the problem (Step 440) or any combination thereof.

Figure 3:
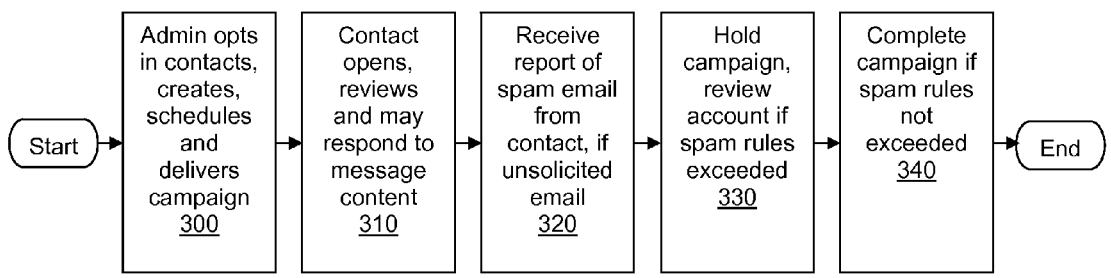
FIG. 3 is a flow diagram illustrating a possible embodiment of a method for detecting and mitigating unsolicited email abuse.

The steps included in the embodiments illustrated and described in relation to FIGS. 1-4 are not limited to the embodiment shown in FIGS. 1 and 3 and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of: a) importing a list of email addresses for one or more contacts into one or more software components in a software combination executed on one or more servers communicatively coupled to a network, the one or more contacts stored in a data storage communicatively coupled to the network; b) determining, for each email address in the list of email addresses, if the email address is opted in to receive an email distribution from an administrator of an account associated with a business ID; c) if the email address is opted in, determining if the email address is found in a database of known undeliverable email addresses; d) if email addresses found in the database of known undeliverable email addresses exceeds an amount allowed by one or more bounce limit rules: i) deferring importing the list of email addresses for the one or more contacts; and ii) displaying an alert referring the administrator to an abuse department for review of the account; e) if email addresses found in the database of known undeliverable email addresses does not exceed the amount allowed by the one or more bounce limit rules: i) delivering the email distribution over a specified interval to each email address opted in; and ii) determining whether a plurality of undeliverable emails in the email distribution exceeds the one or more bounce limit rules; f) if the plurality of undeliverable emails exceeds the one or more bounce limit rules: i) delaying delivery of the email distribution; and ii) displaying the alert referring the administrator to the abuse department for review of the account; g) if the plurality of undeliverable emails does not exceed the one or more bounce limit rules, repeating steps e(i)-f(ii) until either the email distribution concludes or the plurality of undeliverable emails exceeds the one or more bounce limit rules.

2. The method of claim 1 wherein the email distribution is for a marketing campaign.

3. The method of claim 1 wherein the software combination further comprises a contact management software configured to select, by the administrator, the list of email addresses for the one or more contacts.

4. The method of claim 1 further comprising the step of opting in to receive the email distribution, by the administrator, on behalf of the contact.

5. The method of claim 1 further comprising the step of opting in directly, by the contact, via a form on a webpage managed by the administrator.

6. The method of claim 1 further comprising the step of opting in directly, by the contact, via a permission email sent by the administrator.

7. The method of claim 1 further comprising the step of opting out, by the contact, to unsubscribe from the email distribution.

8. The method of claim 7 wherein the contact clicks on a link in a footer of a content in the email distribution to unsubscribe from the email distribution.

9. The method of claim 1 wherein the bounce limit rules determine an excessive bounce rate by comparing a percentage of the one or more undeliverable emails with a total of all emails.

10. The method of claim 1 wherein the specified interval is determined by a set of email distribution rules.

11. The method of claim 10 wherein the email distribution rules determine a batch size and a delay time between sending one or more batches of email.

12. The method of claim 11 further comprising the step of determining if the email distribution is being sent to a contact for a first time.

13. The method of claim 12 further comprising the step of, if the email distribution is being sent to the contact for the first time, applying the email distribution rules.

14. The method of claim 1 further comprising the step of determining if the business ID is found in a database of known abuse violations.

15. The method of claim 14 further comprising the step of disabling further import, opt in and email distribution functionality if email addresses found in the database of known undeliverable email addresses exceeds the amount allowed by the one or more bounce limit rules, if the plurality of undeliverable emails exceeds the one or more bounce limit rules or if the business ID is found in the database of known abuse violations.

16. The method of claim 14 further comprising the step of sending an email to the administrator if email addresses found in the database of known undeliverable email addresses exceeds the amount allowed by the one or more bounce limit rules, if the plurality of undeliverable emails exceeds the one or more bounce limit rules or if the business ID is found in a database of known abuse violations.

17. The method of claim 14 further comprising the step of sending an email to the abuse department if email addresses found in the database of known undeliverable email addresses exceeds the amount allowed by the one or more bounce limit rules, if the plurality of undeliverable emails exceeds the one or more bounce limit rules or if the business ID is found in a database of known abuse violations.

18. The method of claim 13 further comprising the step of updating the database to reflect the appropriate status if email addresses found in the database of known undeliverable email addresses exceeds the amount allowed by the one or more bounce limit rules, if the plurality of undeliverable emails exceeds the one or more bounce limit rules or if the business ID is found in a database of known abuse violations.

19. A system comprising one or more software components in a software combination executed on one or more server devices communicatively coupled to a network, the software combination comprising:
   a) an import software component configured to import a list of email addresses for one or more contacts, the one or more contacts stored in a data storage device communicatively coupled to the network and comprising a database of the one or more contacts and a database of known undeliverable email addresses;
   b) an opt-in software component configured to: i) opt in a contact to an email distribution by an administrator of an account associated with a business ID; and ii) determine, for each email address in the list of email addresses, if the email address is opted in to receive the email distribution;
   c) a message delivery software component configured to: i) deliver the email distribution over a specified interval; and ii) process one or more undeliverable emails in the email distribution;

d) a bounce detection software component configured to: i) determine, for each email in the list of email addresses, if the email address is found in the database of known undeliverable email addresses; ii) determine if email addresses found in the database of known undeliverable email addresses exceeds an amount allowed by one or more bounce limit rules; and iii) determine whether a plurality of undeliverable emails in the email distribution exceeds the one or more bounce limit rules; and e) an abuse mitigation software component configured to: i) display an alert referring the administrator to an abuse department for review of the account if email addresses found in the database of known undeliverable email addresses exceeds the amount allowed by the one or more bounce limit rules or if the plurality of undeliverable emails exceeds the one or more bounce limit rules; ii) defer importing a list of email addresses for the one or more contacts if email addresses found in the database of known undeliverable email addresses exceeds the amount allowed by the one or more bounce limit rules; and iii) delay delivery of the email distribution if the plurality of undeliverable emails exceeds the one or more bounce limit rules.

20. The system of claim 19 wherein the email distribution is for a marketing campaign.

21. The system of claim 19 wherein the software combination further comprises a contact management software configured to select, by the administrator, the list of email addresses for the one or more contacts.

22. The system of claim 19 further comprising a software component configured to opt in to receive the email distribution, by the administrator, on behalf of the contact.

23. The system of claim 19 further comprising a software component configured to opt in the contact directly via a form on a webpage managed by the administrator.

24. The system of claim 19 further comprising a software component configured to opt in the contact directly via a permission email sent by the administrator.

25. The system of claim 19 further comprising a software component configured to opt out the contact directly.

26. The system of claim 25 wherein the contact clicks on a link in a footer of a content in the email distribution to unsubscribe from the email distribution.

27. The system of claim 19 wherein the bounce limit rules determine an excessive bounce rate by comparing a percentage of the one or more undeliverable emails with a total of all emails.

28. The system of claim 19 wherein the specified interval is determined by a set of email distribution rules.

29. The system of claim 28 wherein the email distribution rules determine a batch size and a delay time between sending one or more batches of email.

30. The system of claim 29 further comprising a software component configured to determine if the email distribution is being sent to a contact for a first time.

31. The system of claim 30 further comprising a software component configured to, if the email distribution is being sent to the contact for the first time, apply the email distribution rules.

32. The system of claim 19 further comprising a software component configured to determine if the business ID is found in a database of known abuse violations.

33. The system of claim 32 further comprising a software component configured to disable further import, opt in and email distribution functionality if email addresses found in the database of known undeliverable email addresses exceeds an amount allowed by the one or more bounce limit rules, if the plurality of undeliverable emails exceeds the one or more bounce limit rules or if the business ID is found in a database of known abuse violations.

34. The system of claim 32 further comprising a software component configured to send an email to the administrator if email addresses found in the database of known undeliverable email addresses exceeds an amount allowed by the one or more bounce limit rules, if the plurality of undeliverable emails exceeds the one or more bounce limit rules or if the business ID is found in a database of known abuse violations.

35. The system of claim 32 further comprising a software component configured to send an email to the abuse department if email addresses found in the database of known undeliverable email addresses exceeds an amount allowed by the one or more bounce limit rules, if the plurality of undeliverable emails exceeds the one or more bounce limit rules or if the business ID is found in a database of known abuse violations.

36. The system of claim 32 further comprising a software component configured to update the database to reflect the appropriate status if email addresses found in the database of known undeliverable email addresses exceeds an amount allowed by the one or more bounce limit rules, if the plurality of undeliverable emails exceeds the one or more bounce limit rules or if the business ID is found in a database of known abuse violations.

* * * * *